(12) United States Patent
Matsumoto et al.

(10) Patent No.: US 12,164,725 B2
(45) Date of Patent: Dec. 10, 2024

(54) DISPLAY DEVICE

(71) Applicant: Samsung Display Co., Ltd., Yongin-si (KR)

(72) Inventors: Kazuhiro Matsumoto, Yokohama (JP); Masahiko Takiguchi, Yokohama (JP); Satoshi Uchino, Yokohama (JP)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/095,078

(22) Filed: Jan. 10, 2023

(65) Prior Publication Data

US 2023/0280863 A1    Sep. 7, 2023

(30) Foreign Application Priority Data

Mar. 3, 2022   (KR) .................. 10-2022-0027440

(51) Int. Cl.
*G06F 3/041*      (2006.01)
*G06F 3/044*      (2006.01)
*G06F 18/2415*    (2023.01)

(52) U.S. Cl.
CPC ........ *G06F 3/04182* (2019.05); *G06F 3/0443* (2019.05); *G06F 18/2415* (2023.01); *G06F 3/0412* (2013.01); *G06F 3/0445* (2019.05); *G06F 3/0446* (2019.05); *G06F 2203/04101* (2013.01); *G06F 2203/04108* (2013.01)

(58) Field of Classification Search
CPC ............... G06F 3/04166; G06F 3/0443; G06F 3/04182; G06F 3/0445; G06F 3/0412; G06F 3/0446; G06F 18/2415; G06F 2203/04101; G06F 2203/04108

USPC ......................................................... 345/174
See application file for complete search history.

(56) References Cited

U.S. PATENT DOCUMENTS

| | | | |
|---|---|---|---|
| 9,383,867 B2 | 7/2016 | Hirakawa et al. | |
| 10,948,949 B2 | 3/2021 | Lee et al. | |
| 11,195,447 B2 | 12/2021 | Choi et al. | |
| 11,216,135 B2 | 1/2022 | Tabata | |
| 2013/0038573 A1* | 2/2013 | Chang | G06F 3/04166 345/174 |
| 2015/0029136 A1* | 1/2015 | Shahparnia | G06F 3/03545 345/174 |
| 2018/0069060 A1 | 3/2018 | Rappoport et al. | |

(Continued)

FOREIGN PATENT DOCUMENTS

| | | |
|---|---|---|
| JP | 5632854 | 10/2014 |
| JP | 6640389 | 2/2020 |

(Continued)

*Primary Examiner* — Jimmy H Nguyen
(74) *Attorney, Agent, or Firm* — CANTOR COLBURN LLP

(57) ABSTRACT

A display device includes a display panel, an input sensing layer disposed on the display panel and which outputs a sensing signal in response to an external input and an approach of an object, and a sensing controller which controls a drive of the input sensing layer and receives the sensing signal from the input sensing layer. The sensing controller includes a location sensing block which generates a location information signal including location information of the external input in response to the sensing signal, and an approach sensing block which determines whether the object approaches in response to the sensing signal and generates an approach information signal.

19 Claims, 10 Drawing Sheets

(56) References Cited

U.S. PATENT DOCUMENTS

2020/0050341 A1\* 2/2020 Tabata .............. G06F 3/041661
2020/0074913 A1\* 3/2020 Choi .................... G09G 3/2096

FOREIGN PATENT DOCUMENTS

| KR | 1020200027134 | 3/2020 |
|----|---------------|--------|
| WO | 2011055534 | 5/2011 |
| WO | 2018012719 | 1/2018 |
| WO | 2018193711 | 10/2018 |

\* cited by examiner

| Class | Meaningful Value | Class | Meaningful Value |
|---|---|---|---|
| DSC1 | DT1 | DSC4 | DT5 |
| DSC2 | DT2 | DSC5 | DT6 |
| DSC3 | DT3 | TYC | TC1 |

DISPLAY DEVICE

This application claims priority to Korean Patent Application No. 10-2022-0027440, filed on Mar. 3, 2022, and all the benefits accruing therefrom under 35 U.S.C. § 119, the content of which in its entirety is herein incorporated by reference.

BACKGROUND

1. Field

The disclosure relates to a display device. More particularly, the disclosure relates to a display device capable of determining whether an object approaches thereto based on position information of an external input.

2. Description of the Related Art

Multimedia electronic devices, such as televisions, mobile phones, tablet computers, navigation units, and game units, typically include a display device to display images. Such an electronic device may include an input sensor that provides a touch-based input method allowing users to easily and intuitively input information or commands in addition to the usual input methods, such as a button, a keyboard, a mouse, etc.

The input sensor included in the display device may sense a touch position of the external input.

SUMMARY

The disclosure provides a display device capable of determining whether an object approaches thereto using an input sensor that senses a touch position of an external input.

Embodiments of the invention provide a display device including a display panel which displays an image and an input sensing layer disposed on the display panel and which outputs a sensing signal in response to an external input and an approach of an object. In such embodiments, the display device includes a sensing controller which controls a drive of the input sensing layer and receives the sensing signal from the input sensing layer. In such embodiments, the sensing controller includes a location sensing block which generates a location information signal including location information of the external input in response to the sensing signal, and an approach sensing block which determines whether the object approaches in response to the sensing signal and generates an approach information signal.

In an embodiment, the approach sensing block may include a signal classification part which generates a first classification sensing signal including information about a probability with which the sensing signal belongs to each of a plurality of distance classes based on the distance classes defined with respect to a distance between the object and the display device. In such an embodiment, the approach sensing block may further include an approach determining part which generates the approach information signal based on the first classification sensing signal.

In an embodiment, the signal classification part may generate the first classification sensing signal using a convolutional neural network.

In an embodiment, the signal classification part may receive a prestored learning value and generates the first classification sensing signal using the learning value through the convolutional neural network.

In an embodiment, the approach determining part may include a distance calculator which generates a distance information signal including an adjacent distance between the object and the display device in response to the first classification sensing signal. In such an embodiment, the approach determining part may further include an approach determiner which generates the approach information signal based on the distance information signal.

In an embodiment, the approach determining part may further include a frame determiner which determines whether the object approaches at every frame based on the distance information signal and generates a preliminary approach information signal and a memory which stores the preliminary approach information signal, which is provided in plural. In such an embodiment, the approach determiner may generate the approach information signal in response to the preliminary approach information signals stored in the memory.

In an embodiment, the frame determiner may receive a reference distance to determine whether the object approaches. In such an embodiment, the frame determiner may compare the adjacent distance included in the distance information signal with the reference distance and accumulate the preliminary approach information signal in the memory when the adjacent distance is equal to or less than the reference distance.

In an embodiment, the approach determiner may compare a cumulative value of the preliminary approach information signal accumulated in the memory with a predetermined reference value and generate the approach information signal.

In an embodiment, the signal classification part may generate a second classification sensing signal including information about a probability with which the sensing signal belongs to each of the distance classes and a type class based on the distance classes and the type class defined with respect to a type of a predetermined reference object. In such an embodiment, the distance calculator may generate a type signal including information indicating that the object is included in the reference object when it is determined that the object is included in the reference object in response to the second classification sensing signal.

In an embodiment, the approach determiner may generate a state signal to maintain the approach state of the object as a predetermined state in response to the type signal.

In an embodiment, the input sensing layer may include a plurality of scan electrodes and a plurality of sensing electrodes electrically insulated from the scan electrodes. In such an embodiment, the sensing controller may transmit an input scan signal to the scan electrodes and receive the sensing signal from the sensing electrodes.

In an embodiment, the input sensing layer may generate the sensing signal using a mutual capacitance method.

In an embodiment, The sensing controller further includes a driving block that applies the input scan signal to the input sensing layer at a first driving frequency or a second driving frequency different from the first driving frequency.

In an embodiment, the driving block may apply the input scan signal to the input sensing layer at one of the first driving frequency and the second driving frequency, which is determined based on the approach information signal.

In an embodiment, the driving block may apply the input scan signal to the input sensing layer at the first driving frequency when the approach information signal includes first state information indicating that the object approaches. In such an embodiment, the driving block may apply the input scan signal to the input sensing layer at the second driving frequency when the approach information signal includes second state information indicating that the object does not approach. In such an embodiment, the first driving frequency may be higher than the second driving frequency.

In an embodiment, the location sensing block may generate the location information signal at a same frequency as the one of the first driving frequency and the second driving frequency at which the driving block applies the input scan signal to the input sensing layer.

In an embodiment, the approach sensing block may generate the approach information signal at an approach sensing frequency different from the first and second driving frequencies.

In an embodiment, the approach sensing frequency may be lower than each of the first and second driving frequencies.

In an embodiment, the sensing controller may further include a signal compensation block which removes a noise component included in the sensing signal and generates a compensation sensing signal. In such an embodiment, the location sensing block may generate the location information signal in response to the compensation sensing signal, and the approach sensing block may generate the approach information signal in response to the compensation sensing signal.

In an embodiment, the display panel may include a base layer, a display element layer disposed on the base layer and including a plurality of pixels, and an encapsulation layer disposed on the display element layer. In such an embodiment, the input sensing layer may be disposed directly on the encapsulation layer.

According to embodiments of the invention, the display device determines the location information of the external input and the approach of the object through the input sensing layer. Accordingly, it is possible to determine whether the object approaches using only the input sensing layer without employing an additional sensor. Accordingly, the manufacturing cost of the display device is reduced, and a degree of freedom in design of the display device is improved.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1:
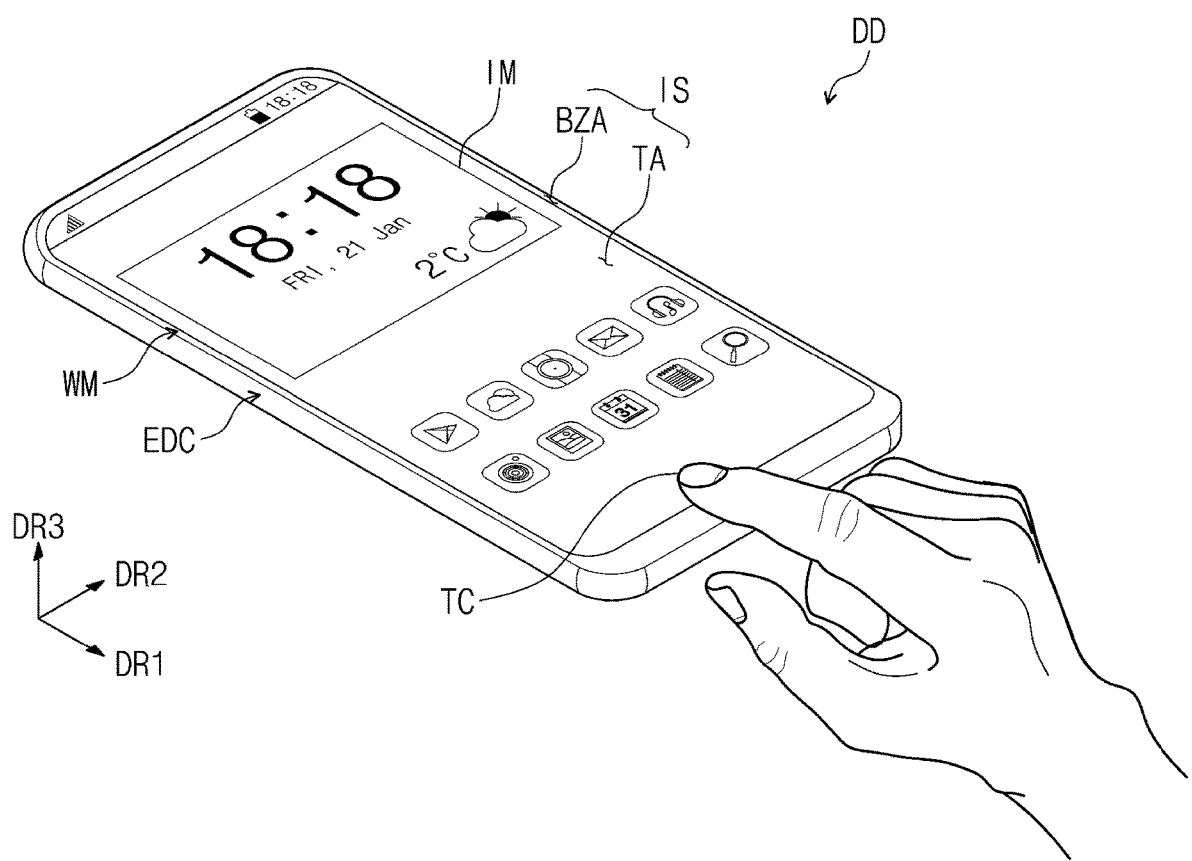
FIG. 1 is a perspective view of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the disclosure.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within #30%, 20%, 10% or 5% of the stated value.

Hereinafter, embodiments of the disclosure will be described with reference to the accompanying drawings.

Figure 2:
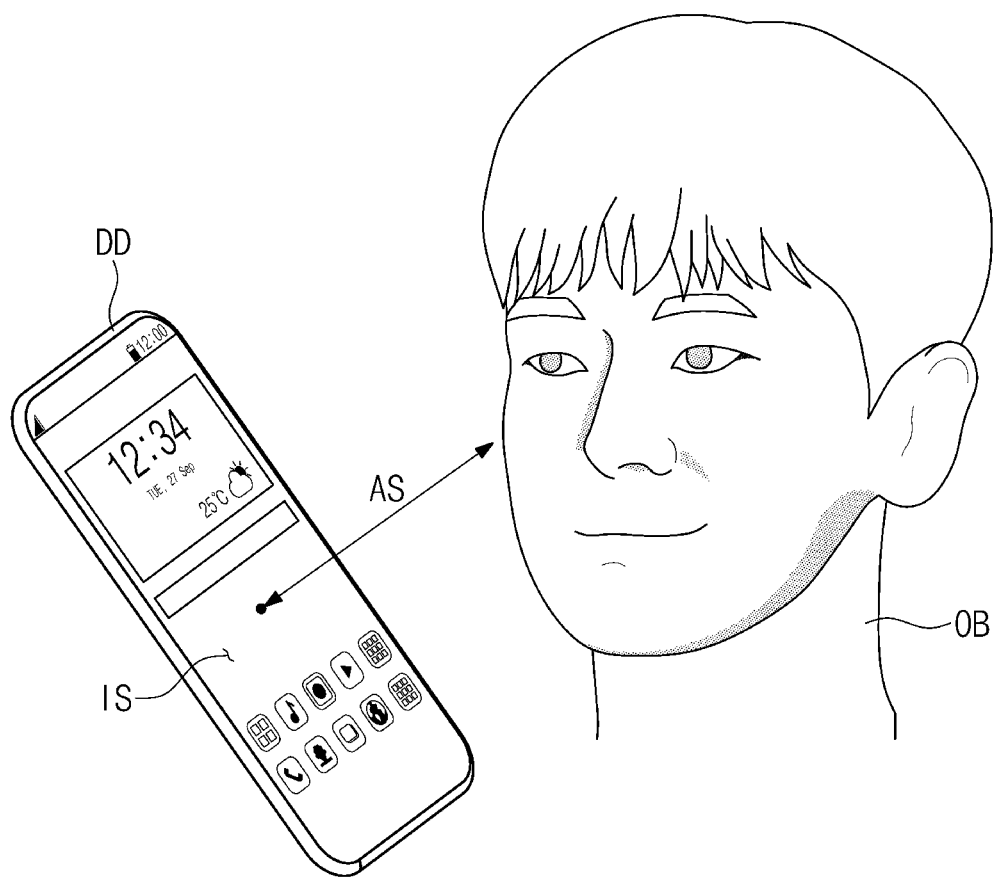
FIG. 2 is a conceptual view of a display device and an object according to an embodiment of the disclosure.

FIG. 1 is a perspective view of a display device DD according to an embodiment of the disclosure. FIG. 2 is a conceptual view of the display device DD and an object OB according to an embodiment of the disclosure.

Referring to FIG. 1, an embodiment of the display device DD may be a device that is activated in response to electrical signals. FIGS. 1 and 2 show an embodiment where the display device DD is a smartphone, however, the disclosure should not be limited thereto or thereby. The display device DD may be applied to a large-sized display device, such as a television set or a monitor, and a small and medium-sized display device, such as a tablet computer, a notebook computer, a car navigation unit, or a game unit. However, these are merely examples, and the display device DD may be applied to other display devices as long as they do not depart from the concept of the disclosure.

The display device DD may have a rectangular shape defined by long sides extending in a first direction DR1 and short sides extending in a second direction DR2 crossing the first direction DR1 and provided with rounded vertices. However, the shape of the display device DD should not be limited to the rectangular shape, and the display device DD may have a variety of shapes, e.g., a circular shape. The display device DD may display an image IM toward a third direction DR3 through a display surface IS that is substantially parallel to each of the first direction DR1 and the second direction DR2. The display surface IS through which the image IM is displayed may correspond to a front surface of the display device DD.

In embodiments described herein, front (or upper) and rear (or lower) surfaces of each member are defined with respect to a direction in which the image IM is displayed. The front and rear surfaces are opposite to each other in the third direction DR3, and a normal line direction of each of the front and rear surfaces may be substantially parallel to the third direction DR3.

A separation distance in the third direction DR3 between the front surface and the rear surface may correspond to a thickness in the third direction DR3 of the display device DD. Here, the first, second, and third directions DR1, DR2, and DR3 may be relative to each other and may be changed to other directions.

The display device DD may sense an external input TC applied thereto from the outside. The external input TC may include various forms of inputs provided from the outside of the display device DD. The external input TC may include one of various external inputs, such as a body part of a user, light, heat, pressure, etc., or a combination thereof. In an embodiment, the external input TC of the user may be a touch input applied to the front surface by a hand of the user, however, this is merely an example, and the external input TC by the user may be provided in various ways. In an embodiment, the display device DD may sense the external input TC by the user which is applied to a side surface or rear surface of the display device DD based on a structure thereof, however, it should not be particularly limited. The display device DD may sense position information, e.g., coordinate information, of the external input TC.

According to an embodiment, the external input TC may further include inputs generated by an input device, e.g., a stylus pen, an active pen, a touch pen, an electronic pen, an e-pen, or the like, in addition to the hand of the user.

The display surface IS of the display device DD may be divided into a transmission area TA and a bezel area BZA. The image IM may be displayed through the transmission area TA. The user may view the image IM through the transmission area TA. In an embodiment, the transmission area TA may have a quadrangular shape with rounded vertices. However, this is merely an example, and the transmission area TA may have a variety of shapes and should not be particularly limited.

The bezel area BZA may be defined adjacent to the transmission area TA. The bezel area BZA may have a predetermined color. The bezel area BZA may surround the transmission area TA. Accordingly, the shape of the transmission area TA may be defined by the bezel area BZA, however, this is merely an example. Alternatively, the bezel area BZA may be disposed adjacent to only one side of the transmission area TA or may be omitted. The display device DD may be variously implemented or modified, and it should not be particularly limited.

Referring to FIG. 2, an embodiment of the display device DD may sense the object OB approaching thereto from the outside of the display device DD. In an embodiment, for example, the display device DD may determine whether the object OB approaches based on an adjacent distance AS between the display device DD and the object OB. In detail, the display device DD may determine whether the object OB approaches based on the adjacent distance AS between the display surface IS and the object OB. However, this is merely an example, and the display device DD may determine whether the object OB approaches based on heat, sound, or signal provided from the object OB to the display device DD.

In an embodiment, for example, the object OB may include various forms of inputs provided from the outside of the display device DD to the display device DD. FIG. 2 shows an embodiment where the object OB is a user's face, however, the object OB should not be limited to the user's face. In an alternative embodiment, for example, the object OB may be a user's hand or a user's gaze. Alternatively, the object OB may be the input device, such as the stylus pen, the active pen, the touch pen, etc., rather than the user. In an embodiment, for example, referring to FIGS. 1 and 2, the object OB may be different from the external input TC of FIG. 1. In an embodiment, for example, the external input TC may be the touch input generated by the user's hand, and the object OB may be the user's face approaching the display device DD, however, the disclosure should not be limited thereto or thereby. According to an embodiment, the external input TC and the object OB may be the same input as each other. In an embodiment, the display device DD may recognize the user's hand approaching the display device DD as the object OB and may recognize the touch input by the user's hand applied to the display device DD as the external input TC. In such an embodiment, the object OB may be an input approaching the display device DD to provide the external input TC.

Figure 3:
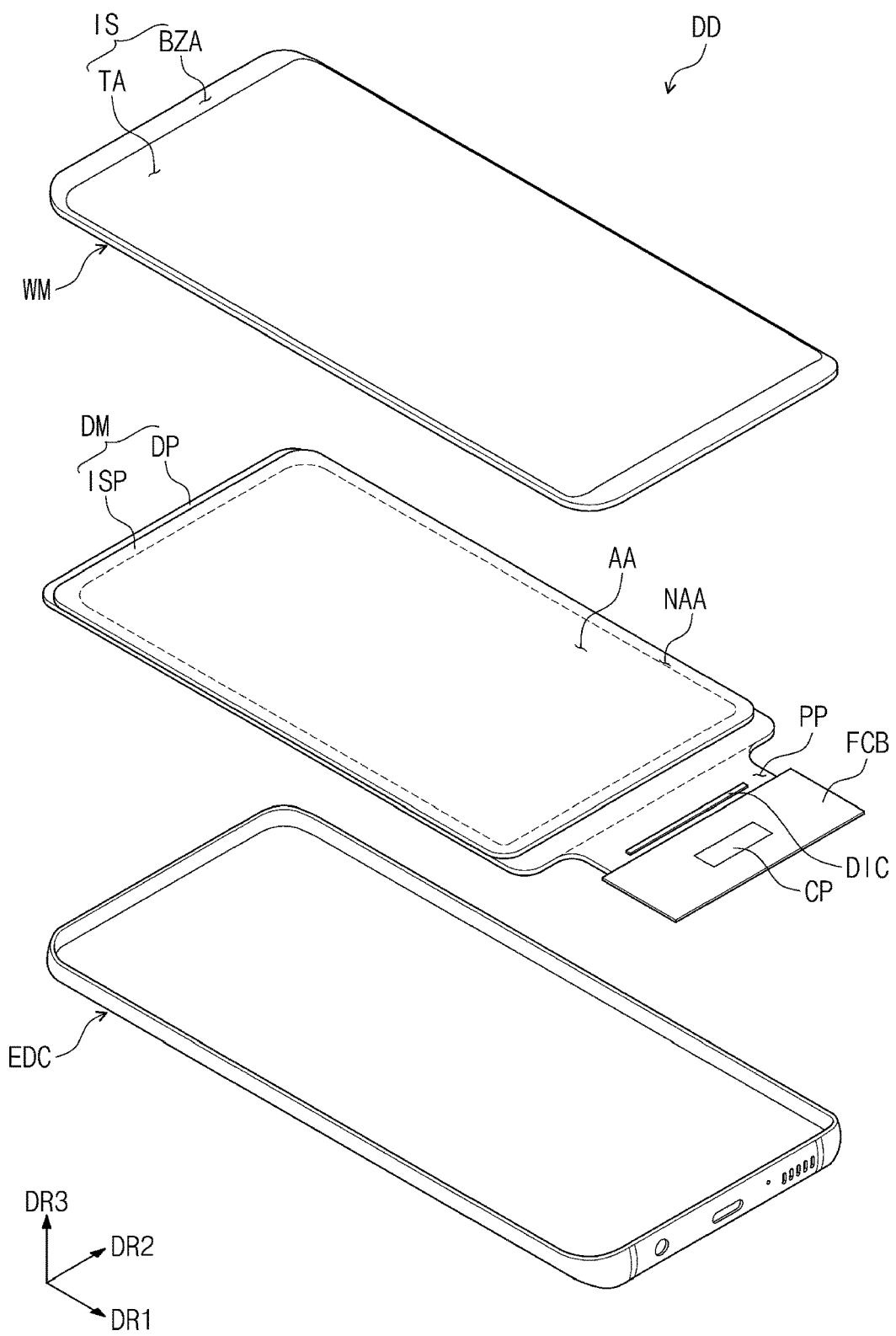
FIG. 3 is an exploded perspective view of a display device according to an embodiment of the disclosure.

FIG. 3 is an exploded perspective view of the display device DD according to an embodiment of the disclosure.

Referring to FIG. 3, an embodiment of the display device DD may include a window WM, a display module DM, and an external case EDC. The display module DM may include a display panel DP for displaying the image IM in response to electrical signals and an input sensing layer ISP for transmitting/receiving information about the external input TC (refer to FIG. 1) and information about the object OB (refer to FIG. 2).

The window WM may protect an upper surface of the display module DM. The window WM may be optically transparent. The window WM may include a transparent material through which the image IM transmits. In an embodiment, for example, the window WM may include glass, sapphire, or plastic. In an embodiment, the window WM may be defined by a single layer, however, it should not be limited thereto or thereby. Alternatively, the window WM may include plural layers.

In an embodiment, although not shown in figures, the bezel area BZA of the display device DD may be defined by printing a material having a predetermined color on an area of the window WM. In an embodiment, for example, the window WM may include a light blocking pattern to define the bezel area BZA. The light blocking pattern may be a colored organic layer and may be formed by a coating method.

The window WM may be coupled with the display module DM by an adhesive film. In an embodiment, for example, the adhesive film may include an optically clear adhesive (OCA) film. However, the adhesive film should not be limited thereto or thereby, and the adhesive film may include an ordinary adhesive. In an alternative embodiment, for example, the adhesive film may include an optically clear resin (OCR) or a pressure sensitive adhesive (PSA) film.

An anti-reflective layer may be further disposed between the window WM and the display module DM. The anti-reflective layer may reduce a reflectance with respect to an external light incident thereto from above of the window WM. According to an embodiment of the disclosure, the anti-reflective layer may include a retarder and a polarizer. The retarder may be a film type or liquid crystal coating type and may include a 2/2 retarder and/or a N/4 retarder. The polarizer may be a film type or liquid crystal coating type. The film type polarizer and retarder may include a stretching type synthetic resin film, and the liquid crystal coating type polarizer and retarder may include liquid crystals aligned in a predetermined alignment. The retarder and the polarizer may be implemented as a single polarizing film.

According to an embodiment, the anti-reflective layer may include color filters. The color filters may be arranged in a predetermined arrangement. The arrangement of the color filters may be determined by taking into account emission colors of pixels included in the display panel DP. The anti-reflective layer may further include a light blocking pattern disposed adjacent to the color filters.

The display module DM may display the image IM in response to electrical signals and may transmit/receive information on the external input. The display module DM may include an effective area AA and a non-effective area NAA. The effective area AA may be defined as an area through which the image IM provided from the display module DM transmits. In addition, the effective area AA may be defined as an area where the input sensing layer ISP senses the external input TC and the object OB. However, the disclosure should not be limited thereto or thereby, and an area through which the image IM is displayed in the display panel DP may be different from an area in which the input sensing layer ISP senses the external input TC and the object OB in the display panel DP.

The non-effective area NAA may be defined adjacent to the effective area AA. In an embodiment, for example, the non-effective area NAA may surround the effective area AA. However, this is merely an example, and the non-effective area NAA may be defined in various shapes and should not be particularly limited. In an alternative embodiment, for example, the non-effective area NAA may be defined adjacent to one side or both sides of the effective area AA. According to an embodiment, the effective area AA of the display module DM may correspond to at least a portion of the transmission area TA, and the non-effective area NAA may correspond to at least a portion of the bezel area BZA.

According to an embodiment, the display panel DP may be a light-emitting type display panel, however, it should not be particularly limited. In an embodiment, for example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot or a quantum rod. Hereinafter, for convenience of description, embodiments where the display panel DP is the organic light emitting display panel will be described in detail.

The input sensing layer ISP may be disposed on the display panel DP and may sense the external input TC and the object OB. In an embodiment, for example, the display device DD may sense the approach of the object OB using the input sensing layer ISP without a separate device that senses the approach of the object OB. An approach sensing block PCB (refer to FIG. 6) of the display device DD may determine whether the object OB approaches based on a signal, for example, a sensing signal SS (refer to FIG. 6) sensed by the input sensing layer ISP. The input sensing layer ISP may be disposed directly on the display panel DP. According to an embodiment, the input sensing layer ISP may be formed on the display panel DP through successive processes. That is, in an embodiment where the input sensing layer ISP is disposed directly on the display panel DP, the adhesive film may not be disposed between the input sensing layer ISP and the display panel DP, however, the disclosure should not be limited thereto or thereby. According to an alternative embodiment, the adhesive film may be disposed between the input sensing layer ISP and the display panel DP. In such an embodiment, the input sensing layer ISP may not be formed through the successive processes with the display panel DP and may be fixed to an upper surface of the display panel DP by the adhesive film after being formed separately from the display panel DP.

In an embodiment, for example, the display device DD may further include a driving chip DIC, a controller CP, and a flexible circuit film FCB. In an embodiment, for example, the display panel DP may further include a pad area PP.

The driving chip DIC and pads may be disposed in the pad area PP, however, the disclosure should not be limited thereto or thereby. Alternatively, the driving chip DIC may be mounted on the flexible circuit film FCB. The display panel DP may be electrically connected to the flexible circuit film FCB via the pads. In an embodiment, for example, the controller CP may be mounted on the flexible circuit film FCB. The display device DD may control an operation of the display panel DP using the controller CP and the driving chip DIC. The flexible circuit film FCB may include a plurality of driving elements. The driving elements may include a circuit part to drive the display panel DP. In an embodiment, for example, the pad area PP may be bent and may be disposed on a rear surface of the display panel DP. Although not shown in figures, the display device DD may further include a sensing controller ICP (refer to FIG. 6). The sensing controller ICP may control an operation of the input sensing layer ISP.

The external case EDC may be coupled with the window WM to define an appearance of the display device DD. The external case EDC may absorb impacts applied thereto from the outside and may prevent foreign substance and moisture from entering the display module DM to protect components accommodated in the external case EDC. In an embodiment, for example, the external case EDC may be provided in a form in which a plurality of storage members is combined with each other.

According to an embodiment, the display device DD may further include an electronic module including various functional modules to operate the display panel DP, a power supply module for supplying a power used for an overall operation of the display device DD, and a bracket coupled to the external case EDC to divide an inner space of the display device DD.

Figure 4:
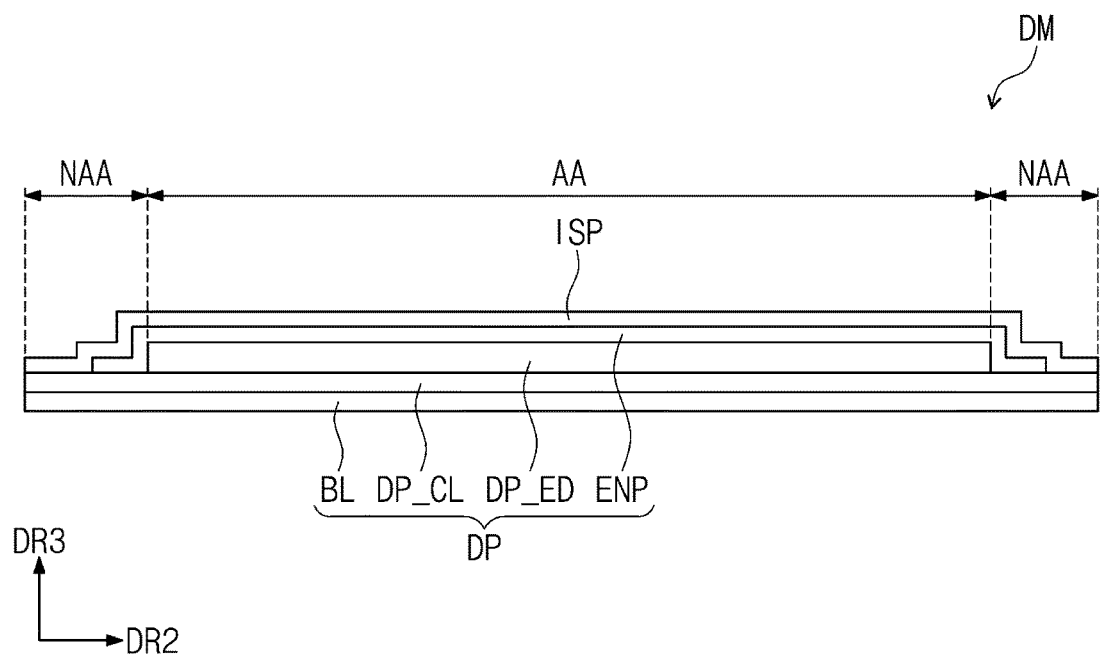
FIG. 4 is a cross-sectional view of a display module according to an embodiment of the disclosure.

FIG. 4 is a cross-sectional view of the display module DM according to an embodiment of the disclosure.

Referring to FIG. 4, an embodiment of the display module DM may include the display panel DP and the input sensing layer ISP. The display panel DP may include a base layer BL, a circuit element layer DP_CL, a display element layer DP_ED, and an encapsulation layer ENP. The circuit element layer DP_CL, the display element layer DP_ED, and the encapsulation layer ENP may be disposed on the base layer BL. Although not shown in figures, the display panel DP may further include functional layers, such as an anti-reflective layer, a refractive index adjustment layer, etc.

The base layer BL may include at least one synthetic resin layer. The base layer BL may include a glass material layer, a metal material layer, or an organic/inorganic composite material layer rather than the synthetic resin layer. In an embodiment, for example, the base layer BL may be a flexible layer. The effective area AA and the non-effective area NAA described with reference to FIG. 2 may be applied to the base layer BL in the same way.

The circuit element layer DP_CL may be disposed on the base layer BL. The circuit element layer DP_CL may include at least one intermediate insulating layer and a circuit element. The intermediate insulating layer may include at least one intermediate inorganic layer and at least one intermediate organic layer. The circuit element may include signal lines and a pixel driving circuit.

The display element layer DP_ED may be disposed on the circuit element layer DP_CL. The display element layer DP_ED may include a plurality of light emitting elements. The light emitting elements may include organic light emitting diodes. The display element layer DP_ED may further include an organic layer such as a pixel definition layer.

The encapsulation layer ENP may encapsulate the display element layer DP_ED. The encapsulation layer ENP may include at least one inorganic layer. The encapsulation layer ENP may further include at least one organic layer. The inorganic layer may protect the display element layer DP_ED from moisture and oxygen, and the organic layer may protect the display element layer DP_ED from a foreign substance such as dust particles. The inorganic layer may include a silicon nitride layer, a silicon oxynitride layer, a silicon oxide layer, a titanium oxide layer, or an aluminum oxide layer. The organic layer may include an acrylic-based organic layer, however, it should not be limited thereto or thereby.

The input sensing layer ISP may be provided or formed on the display panel DP through successive processes. In an embodiment, for example, an adhesive film may be disposed between the input sensing layer ISP and the display panel DP. The input sensing layer ISP may have a multi-layer structure. The input sensing layer ISP may have a single-layer structure of an insulating layer or a multi-layer structure of insulating layers. According to an embodiment, where the input sensing layer ISP is disposed directly on the display panel DP through the successive processes, the input sensing layer ISP may be disposed directly on the encapsulation layer ENP, and the adhesive film may not be disposed between the input sensing layer ISP and the display panel DP. According to an alternative embodiment, the adhesive film may be disposed between the input sensing layer ISP and the display panel DP. In such an embodiment, the input sensing layer ISP may not be manufactured through the successive processes with the display panel DP, and the input sensing layer ISP may be fixed to the upper surface of the display panel DP by the adhesive film after being manufactured through a separate process.

According to an embodiment, the display panel DP may further include an encapsulation substrate. The encapsulation substrate may be disposed on the display element layer DP_ED to face the base layer BL. The encapsulation substrate may include a plastic substrate, a glass substrate, a metal substrate, or an organic/inorganic composite material substrate. A sealant may be disposed between the encapsulation substrate and the base layer BL, and the encapsulation substrate and the base layer BL may be coupled with each other by the sealant. The sealant may include an organic adhesive or a frit that is a ceramic adhesive material. The display element layer DP_ED may be encapsulated by the sealant and the encapsulation substrate.

In an embodiment where the input sensing layer ISP is disposed directly on the display panel DP through the successive processes, the input sensing layer ISP may be disposed directly on the encapsulation substrate. According to an alternative embodiment, where the adhesive film is disposed between the input sensing layer ISP and the display panel DP, the input sensing layer ISP may be fixed to an upper surface of the encapsulation substrate by the adhesive film.

Figure 5:
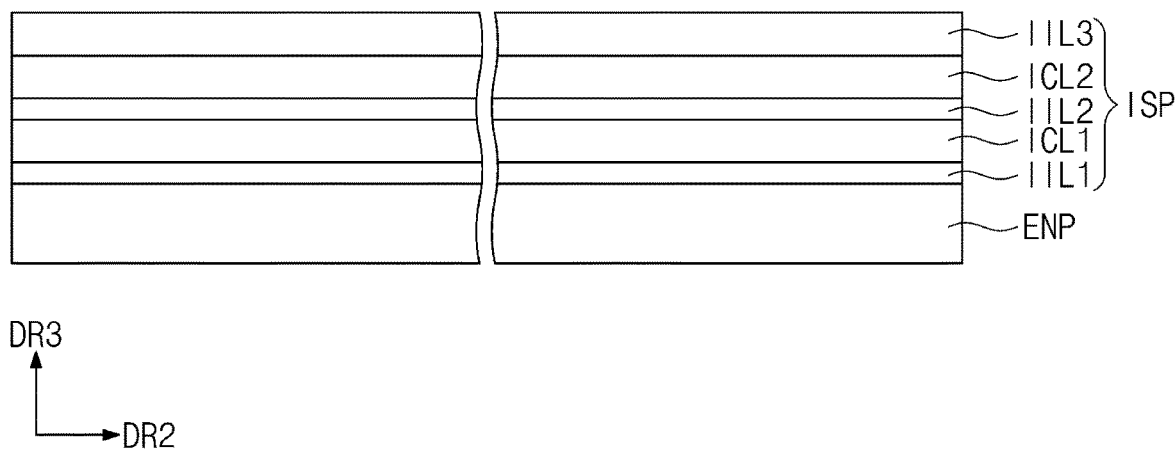
FIG. 5 is a cross-sectional view of an input sensing layer according to an embodiment of the disclosure.
Figure 6:
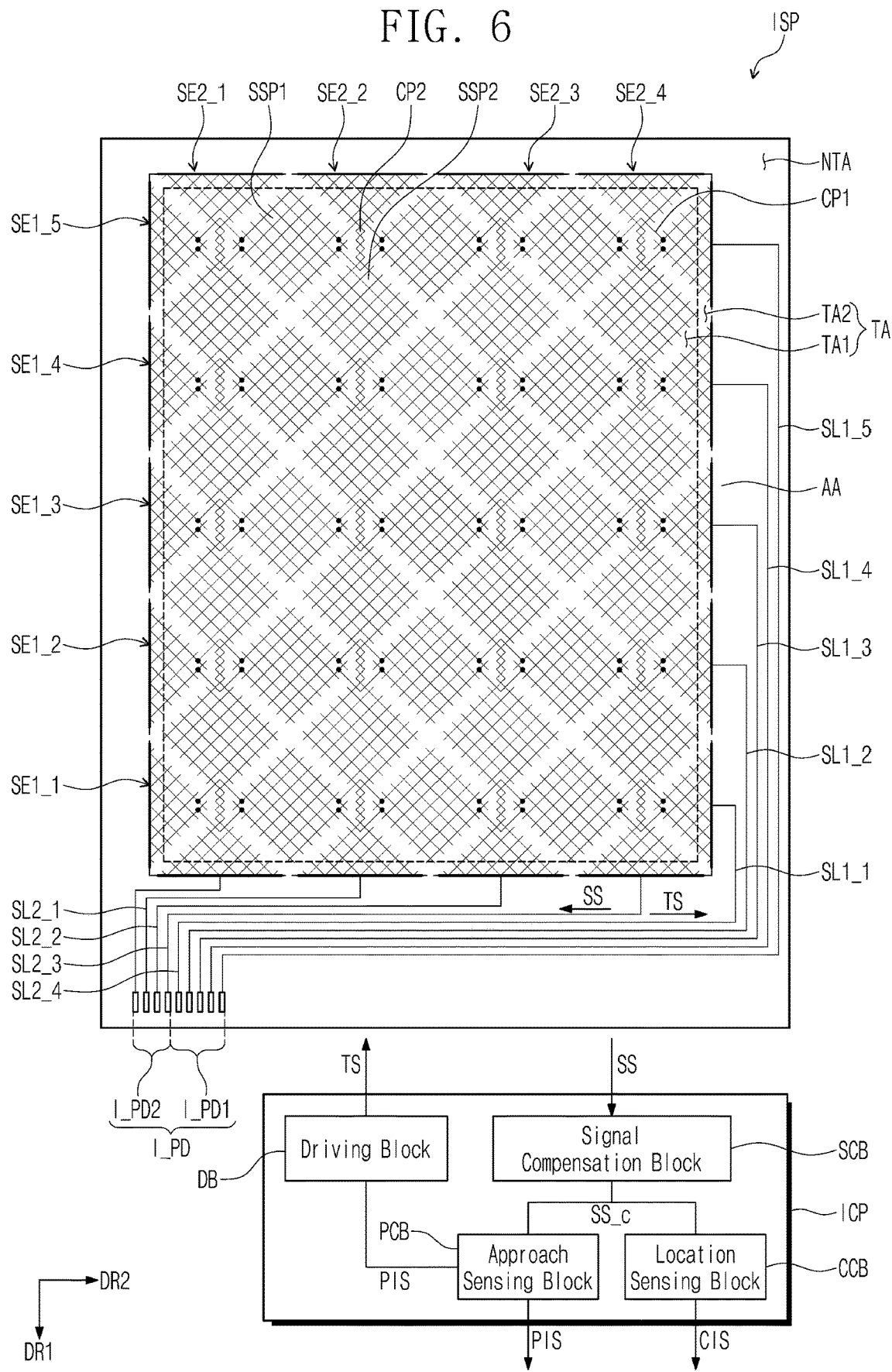
FIG. 6 is a plan view of an input sensing layer and a sensing controller according to an embodiment of the disclosure.

FIG. 5 is a cross-sectional view of the input sensing layer ISP according to an embodiment of the disclosure. FIG. 6 is a plan view of the input sensing layer ISP and the sensing controller ICP according to an embodiment of the disclosure.

Referring to FIGS. 5 and 6, an embodiment of the input sensing layer ISP may include a first sensing insulating layer IIL1, a first conductive layer ICL1, a second sensing insulating layer IIL2, a second conductive layer ICL2, and a third sensing insulating layer IIL3. In an embodiment, the first sensing insulating layer IIL1 may be disposed directly on the encapsulation layer ENP. According to an alternative embodiment, the first sensing insulating layer IIL1 may be omitted.

Each of the first conductive layer ICL1 and the second conductive layer ICL2 may include a plurality of conductive patterns. The conductive patterns may include a plurality of scan electrodes SE1_1 to a plurality of sensing electrodes SE1_5 and SE2_1 to SE2_4 and a plurality of signal lines SL1_1 to SL1_5 and SL2_1 to SL2_4 connected to the scan electrodes SE1_1 to SE1_5 and SE2_1 to SE2_4.

Each of the first sensing insulating layer IIL1, the second sensing insulating layer ILL2, and the third sensing insulating layer IIL3 may include an inorganic material or an organic material. In an embodiment, each of the first sensing insulating layer IIL1 and the second sensing insulating layer IIL2 may be an inorganic layer. The inorganic layer may include at least one selected from aluminum oxide, titanium oxide, silicon oxide, silicon oxynitride, zirconium oxide, and hafnium oxide. The inorganic layer may have a thickness in a range of about 1000 angstroms to about 4000 angstroms.

The third sensing insulating layer IIL3 may be an organic layer. The organic layer may include at least one selected from an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin. The third sensing insulating layer IIL3 including the organic material may prevent moisture from entering the first conductive layer ICL1 and the second conductive layer ICL2 from the outside.

The input sensing layer ISP may include a sensing area SA and a non-sensing area NSA adjacent to the sensing area SA. In an embodiment, for example, the sensing area SA may correspond to at least a portion of the effective area AA (refer to FIG. 4) of the display module DM (refer to FIG. 4). In an embodiment, for example, the sensing area SA may correspond to the effective area AA of the display module DM, and the non-sensing area NSA may correspond to the non-effective area NAA (refer to FIG. 4) of the display module DM. In an embodiment, for example, the sensing area SA may include a first sensing area SA1 and a second sensing area SA2. The second sensing area SA2 may be disposed between the first sensing area SA1 and the non-sensing area NSA. The second sensing area SA2 may be defined adjacent to the first sensing area SA1. In an embodiment, for example, the second sensing area SA2 may surround the first sensing area SA1. However, this is merely an example, and the second sensing area SA2 may have a variety of shapes.

The scan electrodes SE1_1 to SE1_5 and the sensing electrodes SE2_1 to SE2_4 may be disposed in the sensing area SA, and the signal lines SL1_1 to SL1_5 and SL2_1 to SL2_4 may be disposed in the non-sensing area NSA.

In an embodiment, for example, the scan electrodes SE1_1 to SE1_5 and SE2_1 to SE2_4 may include scan electrodes SE1_1 to SE1_5 and sensing electrodes SE2_1 to SE2_4.

The signal lines SL1_1 to SL1_5 and SL2_1 to SL2_4 may include scan signal lines SL1_1 to SL1_5 connected to the scan electrodes SE1_1 to SE1_5 and sensing signal lines SL2_1 to SL2_4 connected to the sensing electrodes SE2_1 to SE2_4.

The scan electrodes SE1_1 to SE1_5 may cross the sensing electrodes SE2_1 to SE2_4. The scan electrodes SE1_1 to SE1_5 may be arranged in the first direction DR1 and may extend in the second direction DR2. The sensing electrodes SE2_1 to SE2_4 may be arranged in the second direction DR2 and may extend in the first direction DR1.

The input sensing layer ISP may obtain coordinate information by a mutual capacitance method. A capacitor may be formed between the scan electrodes SE1_1 to SE1_5 and the sensing electrodes SE2_1 to SE2_4. A capacitance of the capacitor may be changed by the external input TC (refer to FIG. 1) or the object OB (refer to FIG. 2). The sensitivity of the input sensing layer ISP may be determined depending on a variation in the capacitance. However, the disclosure should not be limited thereto or thereby, and alternatively, the input sensing layer ISP may obtain the coordinate information by a self-capacitance method. The scan electrodes SE1_1 to SE1_5 and the sensing electrodes SE2_1 to SE2_4 may be integrated in one sensing electrode, and a capacitance of a capacitor of each of the sensing electrodes may be changed by the external input TC or the object OB.

Each of the scan electrodes SE1_1 to SE1_5 may include first sensor portions SSP1 and first connection portions CP1, which are arranged in the sensing area SA. Each of the first connection portions CP1 may connect the first sensor portions SSP1 adjacent to each other. In one scan electrode, the first sensor portions SSP1 may be connected to the first connection portions CP1 and may extend in the second direction DR2. In an embodiment, for example, each of the sensing electrodes SE2_1 to SE2_4 may include second sensor portions SSP2 and second connection portions CP2, which are arranged in the sensing area SA. Each of second connection portions CP2 may connect second sensor portions SSP2 adjacent to each other. In one sensing electrode, the second sensor portions SSP2 may be connected to the second connection portions CP2 and may extend in the first direction DR1.

The scan electrodes SE1_1 to SE1_5 and the sensing electrodes SE2_1 to SE2_4 may have a mesh shape. As the scan electrodes SE1_1 to SE1_5 and the sensing electrodes SE2_1 to SE2_4 have the mesh shape, a parasitic capacitance between electrodes included in the display panel DP (refer to FIG. 3) and the scan electrodes SE1_1 to SE1_5 and the sensing electrodes SE2_1 to SE2_4 may be reduced.

The scan electrodes SE1_1 to SE1_5 and the sensing electrodes SE2_1 to SE2_4, which have the mesh shape, may include silver, aluminum, copper, chromium, nickel, titanium, or the like, however, materials for the scan electrodes SE1_1 to SE1_5 and the sensing electrodes SE2_1 to SE2_4 should not be limited thereto or thereby.

FIG. 6 shows the scan electrodes SE1_1 to SE1_5 and the sensing electrodes SE2_1 to SE2_4 according to an embodiment, however, the shape of the scan electrodes SE1_1 to SE1_5 and the sensing electrodes SE2_1 to SE2_4 should not be limited thereto or thereby. According to an alternative embodiment of the disclosure, the scan electrodes SE1_1 to SE1_5 and the sensing electrodes SE2_1 to SE2_4 may have a bar shape in which the sensor portion and the connection portion are not distinguished from each other. In FIG. 6, an embodiment where the first sensor portions SSP1 and the second sensor portions SSP2 have a lozenge shape, are shown, however, they should not be limited to the lozenge shape. Alternatively, the first sensor portions SSP1 and the second sensor portions SSP2 may have different polygonal shapes from each other. In addition, the shape of the first sensor portions SSP1 and the second sensor portions SSP2, which are disposed in the first sensing area SA1, may be different from the shape of the first sensor portions SSP1 and the second sensor portions SSP2, which are disposed in the second sensing area SA2. In an embodiment, for example, when each of the first and second sensor portions SSP1 and SSP2 disposed in the first sensing area SA1 has the lozenge shape, each of the first and second sensor portions SSP1 and SSP2 disposed in the second sensing area SA2 may have a shape corresponding to a half of the lozenge shape.

The scan signal lines SL1_1 to SL1_5 and the sensing signal lines SL2_1 to SL2_4 may be disposed in the non-sensing area NSA.

The input sensing layer ISP may include input pads I_PD extending from one ends of the scan signal lines SL1_1 to SL1_5 and the sensing signal lines SL2_1 to SL2_4 and disposed in the non-sensing area NSA. The input pads I_PD may be electrically connected to the scan signal lines SL1_1 to SL1_5 and the sensing signal lines SL2_1 to SL2_4. In an embodiment, for example, the input pads I_PD may include a scan input pad I_PD1 electrically connected to the scan signal lines SL1_1 to SL1_5 and a sensing input pad I_PD2 electrically connected to the sensing signal lines SL2_1 to SL2_4.

The display device DD (refer to FIG. 3) may further include the sensing controller ICP to control an operation of the input sensing layer ISP.

In an embodiment, for example, the sensing controller ICP may be electrically connected to the input sensing layer ISP. The sensing controller ICP may be electrically connected to the scan signal lines SL1_1 to SL1_5 and the sensing signal lines SL2_1 to SL2_4 via the input pads I_PD.

The sensing controller ICP may transmit an input scan signal TS to the scan electrodes SE1_1 to SE1_5 and may receive the sensing signal SS readout from the sensing electrodes SE2_1 to SE2_4. In an embodiment, for example, the input scan signal TS may include a driving control signal sequentially transmitted to the scan electrodes SE1_1 to SE1_5. In a case where the external input TC is provided to the display device DD or the object OB approaches the display device DD, the sensing signal SS may be a signal induced to the sensing electrodes SE2_1 to SE2_4 through a capacitor formed between the scan electrodes SE1_1 to SE1_5 and the sensing electrodes SE2_1 to SE2_4.

In an embodiment, for example, the sensing controller ICP may include a driving block DB, the approach sensing block PCB, and a location sensing block CCB.

The approach sensing block PCB may receive the sensing signal SS from the input sensing layer ISP. The approach sensing block PCB may determine whether the object OB approaches the display device DD based on the sensing signal SS and may generate an approach information signal PIS. The approach sensing block PCB may apply the generated approach information signal PIS to the controller CP (refer to FIG. 3). The controller CP may determine whether to display the image IM (refer to FIG. 1) through the display panel DP based on the approach information signal PIS or may determine a brightness of the image IM displayed through the display panel DP based on the approach information signal PIS. In an embodiment, in a case where the approach information signal PIS includes information indicating that the object OB does not approach the display device DD, the controller CP may not display the image IM through the display panel DP or may decrease the brightness of the image IM displayed through the display panel DP. In such an embodiment, in a case where the approach information signal PIS includes information indicating that the object OB approaches the display device DD, the controller CP may display the image IM through the display panel DP or may increase the brightness of the image IM through the display panel DP.

The location sensing block CCB may receive the sensing signal SS from the input sensing layer ISP. The location sensing block CCB may generate a location information signal CIS including location information of the external input TC based on the sensing signal SS. In an embodiment, for example, the location information signal CIS may include coordinate information of the external input TC. The location sensing block CCB may apply the generated location information signal CIS to the controller CP. The controller CP may allow an operation of a specific program to be executed in the display device DD based on the location information signal CIS or may change the image IM displayed through the display panel DP.

The driving block DB may apply the input scan signal TS to the input sensing layer ISP. In an embodiment, for example, the driving block DB may apply the input scan signal TS to the input sensing layer ISP selectively at a first driving frequency or a second driving frequency lower than the first driving frequency. In an embodiment, for example, the driving block DB may receive the approach information signal PIS from the approach sensing block PCB. The driving block DB may apply the input scan signal TS to the input sensing layer ISP selectively at the first driving frequency or the second driving frequency in response to the approach information signal PIS. In such an embodiment, when the approach information signal PIS includes first status information indicating that the object OB approaches the display device DD, the driving block DB may apply the input scan signal TS to the input sensing layer ISP at the first driving frequency. In such an embodiment, when the approach information signal PIS includes second status information indicating that the object OB does not approach the display device DD, the driving block DB may apply the input scan signal TS to the input sensing layer ISP at the second driving frequency. Accordingly, in the case where it is determined that the input, for example, the object OB, for providing the external input TC to the display device DD approaches the display device DD, the input scan signal TS may be applied to the input sensing layer ISP at a relatively high frequency, and thus, a sensing ability of the input sensing layer ISP may be improved. In such an embodiment, in the case where it is determined that the input, for example, the object OB, for providing the external input TC to the display device DD does not approach the display device DD, the input scan signal TS may be applied to the input sensing layer ISP at a relatively low frequency, and thus, a power consumption of the display device DD may be reduced.

In an embodiment, for example, the approach sensing block PCB may operate at an approach sensing frequency different from the first and second driving frequencies. Although the approach sensing block receives the sensing signal SS from the input sensing layer ISP operated at the first and second driving frequencies, the approach sensing block may generate the approach information signal PIS at the approach sensing frequency. In an embodiment, for example, the approach sensing frequency may be lower than the first and second driving frequencies. Since the approach sensing block PCB may perform only an operation that determines whether the object OB approaches, whether the object OB approaches or not may be determined normally even though the approach sensing block PCB operates at the approach sensing frequency lower than the first and second driving frequencies. Accordingly, the power consumption of the approach sensing block PCB may be reduced.

In an embodiment, for example, the location sensing block CCB may generate the location information signal CIS at a same frequency as the frequency at which the driving block DB applies the input scan signal TS to the input sensing layer ISP (or a selected one of the first and second driving frequencies). In an embodiment, for example, in the case where the driving block DB applies the input scan signal TS to the input sensing layer ISP at the first driving frequency, the location sensing block CCB may also generate the location information signal CIS at the first driving frequency. In the case where the driving block DB applies the input scan signal TS to the input sensing layer ISP at the second driving frequency, the location sensing block CCB may also generate the location information signal CIS at the second driving frequency.

In an embodiment, for example, the sensing controller ICP may further include a signal compensation block SCB. The signal compensation block SCB may receive the sensing signal SS from the input sensing layer ISP. The signal compensation block SCB may remove a noise component included in the sensing signal SS to generate a compensation sensing signal SS_c. In an embodiment, the sensing signal SS may include an initial voltage when the external input TC and the object OB are not provided, a coupling noise caused by the operation of the display panel DP, and a noise caused by a light provided from the outside, e.g., a natural light, a light produced by light fixtures, etc., in addition to the variation in capacitance caused by the external input TC or the object OB. The signal compensation block SCB may remove the noise component from the sensing signal SS and may generate the compensation sensing signal SS_c including only the variation in capacitance caused by the external input TC or the object OB.

In an embodiment, for example, where the sensing controller ICP further includes the signal compensation block SCB, the approach sensing block PCB may generate the location information signal PIS in response to the compensation sensing signal SS_c. In such an embodiment, an accuracy of the approach information signal PIS generated by the approach sensing block PCB may be improved. In an embodiment where the sensing controller ICP further includes the signal compensation block SCB, the location sensing block CCB may generate the location information signal CIS in response to the compensation sensing signal SS_c. In such an embodiment, an accuracy of the location information signal CIS generated by the location sensing block CCB may be improved. Hereinafter, for the convenience of description, the approach sensing block PCB will be described as generating the approach information signal PIS in response to the compensation sensing signal SS_c, and the location sensing block CCB will be described as generating the location information signal CIS in response to the compensation sensing signal SS_c.

Figures 7, 8:
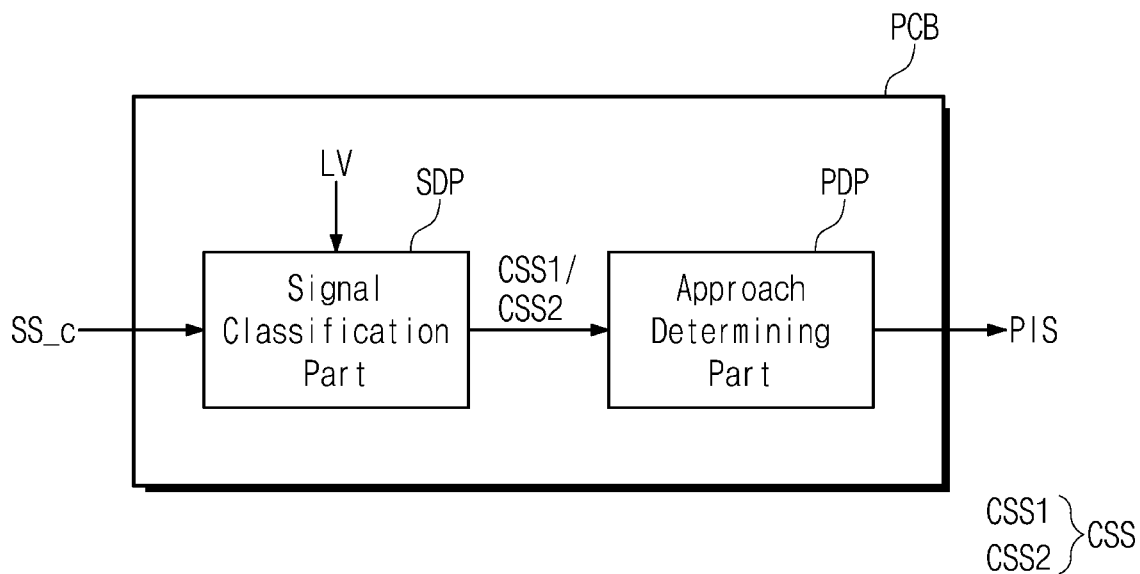
FIG. 7 is a block diagram of an approach sensing block according to an embodiment of the disclosure.
FIG. 8 is a conceptual view illustrating an operation of a signal classification part according to an embodiment of the disclosure.

FIG. 7 is a block diagram of the approach sensing block PCB according to an embodiment of the disclosure. FIG. 8 is a conceptual view illustrating an operation of a signal classification part SDP according to an embodiment of the disclosure.

Referring to FIGS. 7 and 8, an embodiment of the approach sensing block PCB may include the signal classification part SDP and an approach determining part PDP.

In an embodiment, for example, the signal classification part SDP may receive the compensation sensing signal SS_c from the signal compensation block SCB (refer to FIG. 6). The signal classification part SDP may generate a first classification sensing signal CSS1 in response to the compensation sensing signal SS_c. In an embodiment, for example, the signal classification part SDP may include a filter FT to generate the first classification sensing signal CSS1. The filter FT may include a plurality of distance classes DSC1 to DSC5 each being defined with respect to a distance between the display device DD (refer to FIG. 2) and the object OB (refer to FIG. 2). Each of the distance classes DSC1 to DSC5 may have an indication value indicating a distance range between the display device DD (refer to FIG. 2) and the object OB (refer to FIG. 2). In an embodiment, for example, the filter FT may include a first distance class DSC1, a second distance class DSC2, a third distance class DSC3, a fourth distance class DSC4, and a fifth distance class DSC5. The indication value may include a first distance DT1, a second distance DT2, a third distance DT3, a fourth distance DT4, and a fifth distance DT5. In an embodiment, for example, the first to fifth distances DT1 to DT5 may indicate the distance between the display device DD and the object OB. The first distance DT1 may be smaller (or less) than the second distance DT2. The second distance DT2 may be smaller than the third distance DT3. The third distance DT3 may be smaller than the fourth distance DT4. The fourth distance DT4 may be smaller than the fifth distance DT5. The first distance DT1 may indicate a distance, e.g., zero (0), when the display device DD is in contact with the object OB. The first distance class DSC1 may have the first distance DT1 as the indication value. The second distance class DSC2 may have the second distance DT2 as the indication value. The third distance class DSC3 may have the third distance DT3 as the indication value. The fourth distance class DSC4 may have the fourth distance DT4 as the indication value. The fifth distance class DSC5 may have the fifth distance DT5 as the indication value. In an embodiment, for example, the filter FT shown in FIG. 8 may include five distance classes DSC1 to DSC5, however, the disclosure should not be limited thereto or thereby. According to an alternative embodiment, the filter FT may include four or less distance classes or six or more distance classes.

The signal classification part SDP may generate the first classification sensing signal CSS1 based on the compensation sensing signal SS_c and the filter FT. In an embodiment, the signal classification part SDP may calculate a probability with which the compensation sensing signal SS_c belongs to each of the distance classes DSC1 to DSC5 based on the plurality of distance classes DSC1 to DSC5, which are defined based on the distance between the object OB and the display device DD, included in filter FT, and may generate the first classification sensing signal CSS1 including corresponding probability information. In an embodiment, for example, the signal classification part SDP may determine the type of the compensation sensing signal SS_c based on which of the first to fifth distances DT1 to DT5 the adjacent distance AS (refer to FIG. 2) between the object OB and the display device DD corresponds to when the compensation sensing signal CC_c is generated, and then, may calculate the probability with which the adjacent distance AS belongs to each of the first to fifth distances DT1 to DT5. Accordingly, the signal classification part SDP may generate the first classification sensing signal CSS1 including the probability information that the compensation sensing signal SS_c belongs to each of the first to fifth distance classes DSC1 to DSC5.

However, the disclosure should not be limited thereto or thereby. In an embodiment, for example, the filter FT may include a type of class TYC defined based on the type of a predetermined reference object. The type class TYC may have the predetermined reference object as its indication value. The reference object may be set according to the purpose of measuring whether the object OB approaches the display device DD. In an embodiment, for example, in a case where the approach of the object OB is measured to determine whether the user is gazing at the display device DD or whether the user is on a call using the display device DD, it may not be desired to measure whether a user's hand approaches the display device DD. In this case, the user's hand may be set as the reference object, and the type class TYC may have the user's hand as the indication value. The signal classification part SDP may calculate a probability with which the compensation sensing signal SS_c belongs to each of the distance classes DSC1 to DSC5 and the type class TYC based on the distance classes DSC1 to DSC5 included in the filter FT and the type class TYC and may generate a second classification sensing signal CSS2 including corresponding probability information. In an embodiment, for example, in a case where the signal classification part SDP determines that the type of the compensation sensing signal SS_c is highly likely to be a signal generated when the object OB, e.g., the user's hand, approaches the display device DD, the probability information corresponding to the type class TYC among the probability information included in the second classification sensing signal CSS2 may increase.

In an embodiment, for example, the signal classification part SDP may generate the first classification sensing signal CSS1 or the second classification sensing signal CSS2 using an artificial neural network model. In an embodiment, for example, the signal classification part SDP may generate the first classification sensing signal CSS1 or the second classification sensing signal CSS2 using a convolutional neural network model. In such an embodiment, the signal classification part SDP may be provided with a pre-trained learning value LV through the convolutional neural network model, may analyzes the type of the compensation sensing signal SS_c using the learning value LV provided thereto through the convolutional neural network, and may generate the first classification sensing signal CSS1 or the second classification sensing signal CSS2. In an embodiment, for example, a learning process of the learning value LV may be performed based on a sensing signal for learning or a compensation sensing signal for learning according to the distance between the object OB and the display device DD and the filter FT included in the signal classification part SDP. The signal classification part SDP may determine to which type of the distance classes DSC1 to DSC5 the type of the compensation sensing signal SS_c is most likely to correspond using the provided learning value LV and the filter FT and may generate the first classification sensing signal CSS1. The signal classification part SDP may determine to which type of the distance classes DSC1 to DSC5 and the type class TYC the type of the compensation sensing signal SS_c is most likely to correspond using the provided learning value LV and the filter FT and may generate the second classification sensing signal CSS2.

In an embodiment, for example, the approach determining part PDP may generate the approach information signal PIS in response to the first classification sensing signal CSS1 or the second classification sensing signal CSS2. The structure and operation of the approach determining part PDP will hereinafter be described in detail with reference to FIGS. 9A to 11B.

Figure 9A:
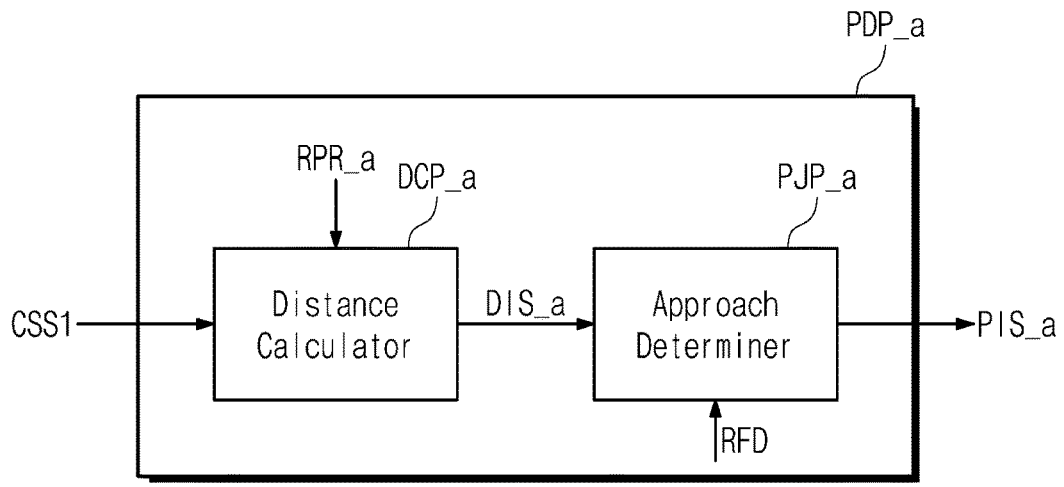
FIGS. 9A and 9B are block diagrams of approach determining parts according to embodiments of the disclosure.
Figure 9B:
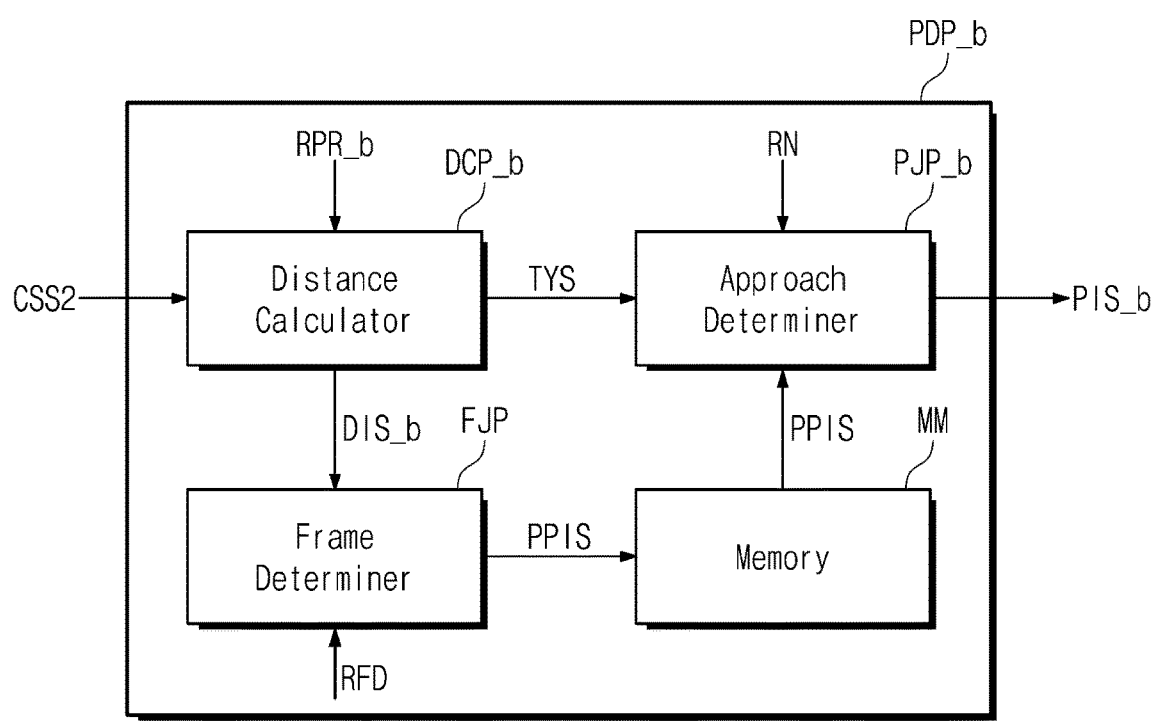
Figure 10:
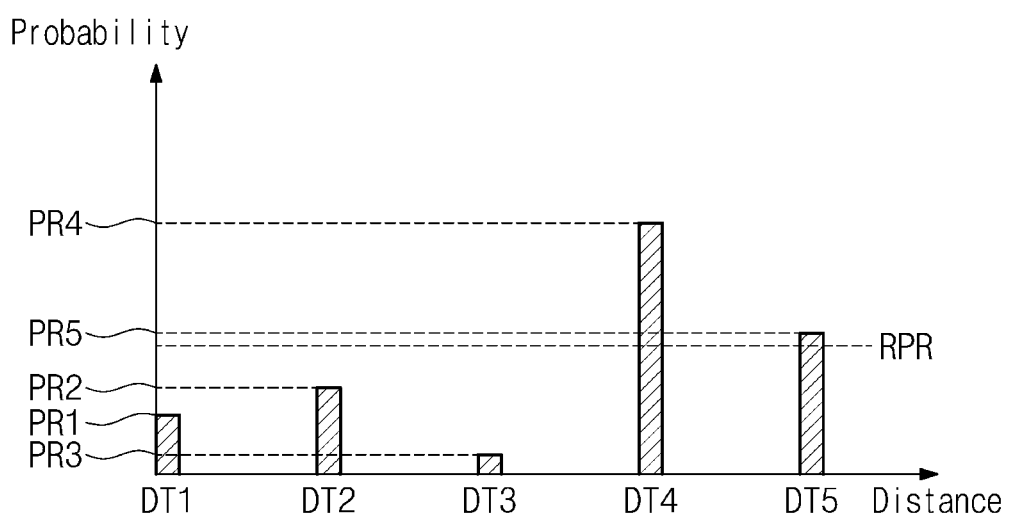
FIG. 10 is a conceptual view illustrating an operation of a distance calculator according to an embodiment of the disclosure.
Figure 11A:
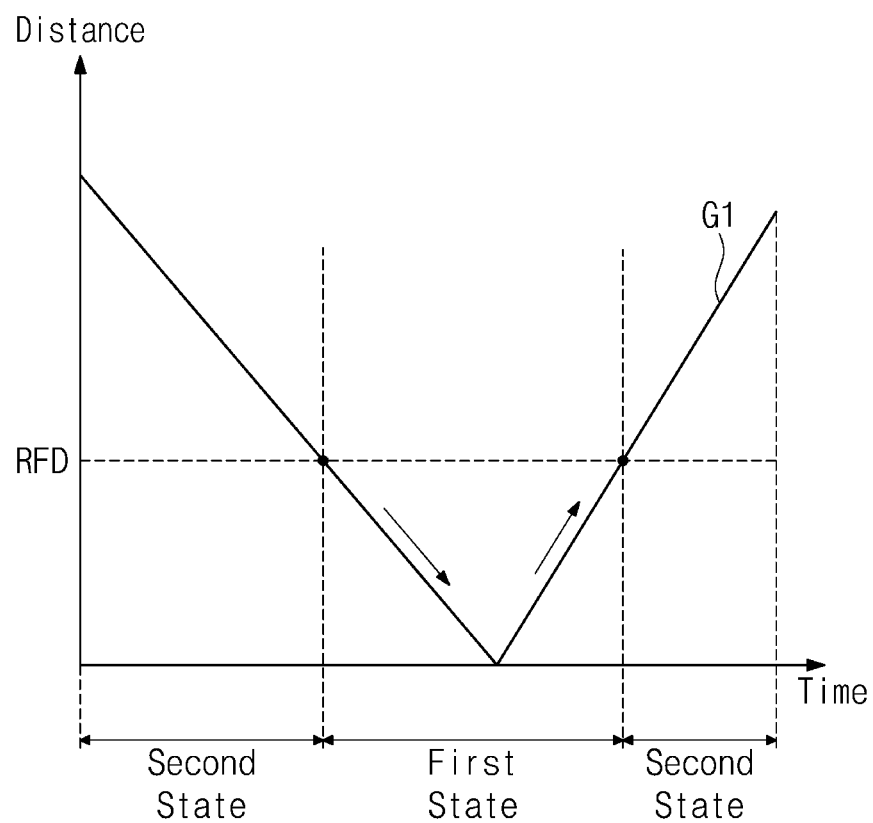
FIGS. 11A and 11B are conceptual views illustrating an operation of an approach determiner and a frame determiner according to embodiments of the disclosure.
Figure 11B:
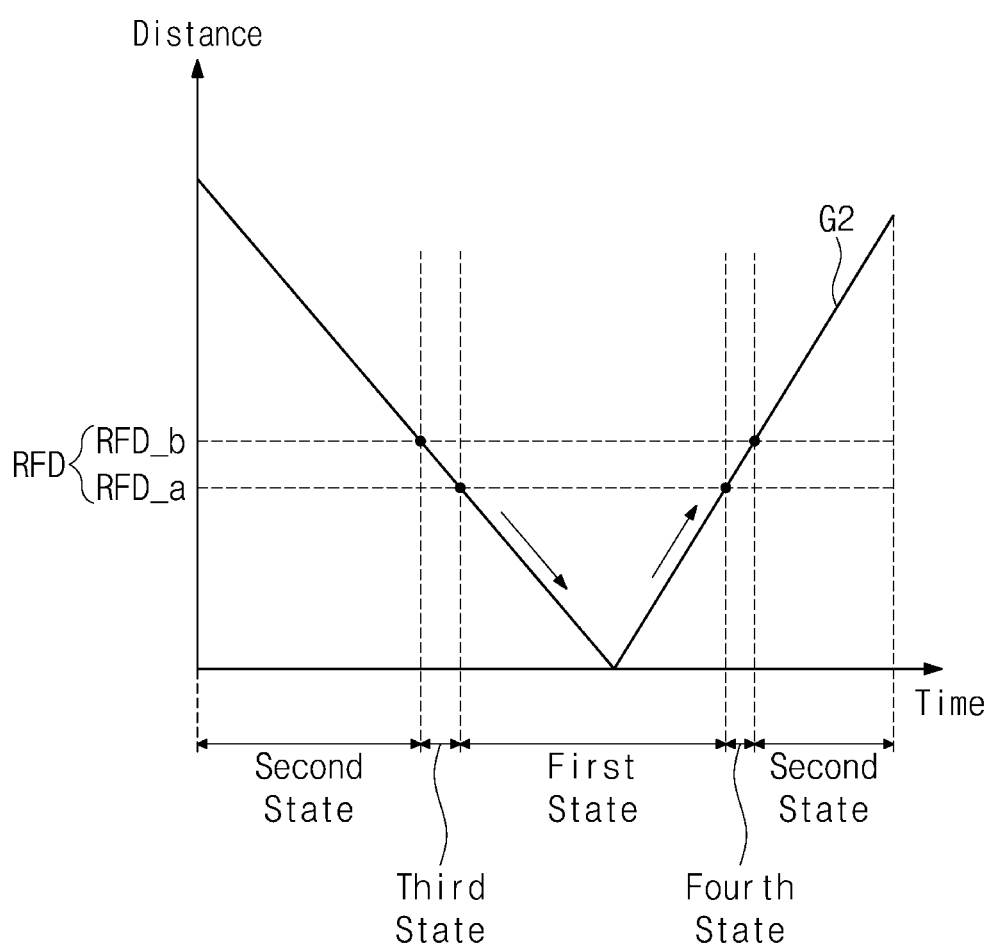

FIGS. 9A and 9B are block diagrams of approach determining parts PDP_a and PDP_b according to embodiments of the disclosure. FIG. 10 is a conceptual view illustrating an operation of a distance calculator according to an embodiment of the disclosure. FIGS. 11A and 11B are conceptual views illustrating an operation of an approach determiner and a frame determiner according to embodiments of the disclosure.

Referring to FIG. 9A, an embodiment of the approach determining part PDP_a may include the distance calculator DCP_a and the approach determiner PJP_a. Hereinafter, the embodiment of FIG. 9A will be described for a case where the signal classification part SDP (refer to FIG. 7) generates the first dividing sensing signal CSS1.

Referring to FIGS. 9A and 10, the distance calculator DCP_a may receive the first classification sensing signal CSS1 from the signal classification part SDP. The distance calculator DCP_a may generate a distance information signal DIS_a including the adjacent distance AS (refer to FIG. 2) between the object OB (refer to FIG. 2) and the display device DD (refer to FIG. 2) in response to the first classification sensing signal CSS1. In an embodiment, for example, the distance calculator DCP_a may receive a predetermined first reference probability RPR_a. The distance calculator DCP_a may compare the probability information with respect to the distance classes DSC1 to DSC5 included in the first classification sensing signal CSS1 with the first reference probability RPR_a. The distance calculator DCP_a may calculate the indication value (for example, one of the first to fifth distances DT1 to DT5) corresponding to the probability information having the probability higher than the first reference probability RPR_a among the probability information included in the first classification sensing signal CSS1 as the adjacent distance AS and may generate the distance information signal DIS_a including information about the corresponding adjacent distance AS. In an embodiment, for example, indication values corresponding to the probability information having the probability higher than the first reference probability RPR_a shown in FIG. 10 may be the fourth distance DT4 and the fifth distance DT5. In this case, the distance calculator DCP_a may calculate an average value of the fourth distance DT4 and the fifth distance DT5 as the adjacent distance AS, however, the disclosure should not be limited thereto or thereby. Alternatively, the distance calculator DCP_a may normalize a distribution of a sum of the fourth distance DT4 and the fifth distance DT5 and may calculate a sum of values obtained by multiplying a normal distribution value by each of the fourth distance DT4 and the fifth distance DT5 as the adjacent distance AS. In addition, the distance calculator DCP_a may calculate the indication value corresponding to the probability information that is the largest among the probability information included in the first classification sensing signal CSS1 as the adjacent distance AS.

Referring to FIGS. 9A, 11A, and 11B, the approach determiner PJP_a may receive the distance information signal DIS_a from the distance calculator DCP_a. The approach determiner PJP_a may generate an approach information signal PIS_a in response to the distance information signal DIS_a. In an embodiment, for example, the approach determiner PJP_a may receive a predetermined reference distance RFD. The approach determiner PJP_a may compare the adjacent distance AS included in the distance information signal DIS_a with the reference distance RFD.

In an embodiment, for example, FIG. 11A shows a first graph G1 showing a variation of the adjacent distance AS included in the distance information signal DIS_a according to a time. In FIG. 11A, an x-axis represents the time, and a y-axis represents the adjacent distance AS between the object OB and the display device DD.

A case where the adjacent distance AS is equal to or smaller than the reference distance RFD may be referred to as a first state, and a case where the adjacent distance AS is greater than the reference distance RFD may be referred to as a second state. In the case of the first state, the approach determiner PJP_a may generate the approach information signal PIS_a including information indicating that the object OB approaches the display device DD. In the case of the second state, the approach determiner PJP_a may generate the approach information signal PIS_a including information indicating that the object OB does not approach the display device DD. In an embodiment, for example, the approach determiner PJP_a may generate the approach information signal PIS_a in the first state and may not generate the approach information signal PIS_a in the second state.

FIG. 11B shows a second graph G2 showing a variation of the adjacent distance AS included in the distance information signal DIS_a according to a time. In this case, an x-axis represents the time, and a y-axis represents the adjacent distance AS between the object OB and the display device DD.

In an embodiment, for example, the reference distance RFD may include a first reference distance RFD_a and a second reference distance RFD_b. The first reference distance RFD_a may be smaller than the second reference distance RFD_b. The first reference distance RFD_a may be a reference distance to determine that the object OB approaches the display device DD in the case where the object OB does not approach the display device DD. The second reference distance RFD_b may be a reference distance to determine that the object OB does not approach the display device DD in the case where the object OB approaches the display device DD. As shown in FIG. 11B, the second graph G2 may include a third state in which the adjacent distance AS is smaller than or equal to the second reference distance RFD_b and greater than the first reference distance RFD_a when the second state is changed to the first state. In addition, the second graph G2 of FIG. 11B may include a fourth state in which the adjacent distance AS is equal to or greater than the first reference distance RFD_a and smaller than the second reference distance RFD_b when the first state is changed to the second state. In this case, the approach determiner PJP_a may determine that the object OB still does not approach the display device DD in the third state and may determine that the object OB approaches the display device DD in the fourth state. Accordingly, it is possible to prevent a malfunction that may occur when the approach determiner PJP_a determines whether the object OB approaches the display device DD, and thus, the reliability of the approach determiner PJP_a may be improved.

Referring to FIG. 9B, an alternative embodiment of the approach determining part PDP_b may include a distance calculator DCP_b, a frame determiner FJP, a memory MM, and approach determiner PJP_b. In FIG. 9B, the same or like reference numerals denote the same or like elements in FIG. 9A, and thus, any repetitive detailed descriptions of the same or like elements in FIG. 9B as those in FIG. 9A will be omitted. Hereinafter, the embodiment of FIG. 9B will be described based on that the signal classification part SDP (refer to FIG. 7) generates the second dividing sensing signal CSS2.

Referring to FIG. 9B, the distance calculator DCP_b may receive the second classification sensing signal CSS2 from the signal classification part SDP. The distance calculator DCP_b may generate a distance information signal DIS_b including the adjacent distance AS (refer to FIG. 2) between the object OB (refer to FIG. 2) and the display device DD (refer to FIG. 2) in response to the second classification sensing signal CSS2. In such an embodiment, the distance calculator DCP_b may generate a type signal TYS including information indicating that the object OB is included in the predetermined reference object in response to the second classification sensing signal CSS2.

In an embodiment, for example, the distance calculator DCP_b may receive a second reference probability RPR_b. The second reference probability RPR_b may include a first sub-probability that is used as a reference to determine that the object OB is included in the predetermined reference object and a second sub-probability that is used as a reference to calculate the adjacent distance AS based on the second classification sensing signal CSS2.

The distance calculator DCP_b may compare probability information about the type class TYC included in the second classification sensing signal CSS2 with the first sub-probability. In an embodiment, when it is determined that the probability information about the type class TYC is equal to or greater than the first sub-probability, the distance calculator DCP_b may generate the type signal TYS including the information indicating that the object OB is included in the reference object. The distance calculator DCP_b may provide the generated type signal TYS to the approach determiner PJP_b. In such an embodiment, when it is determined that the probability information about the type class TYC is smaller than the first sub-probability, the distance calculator DCP_b may not generate the type signal TYS, however, the disclosure should not be limited thereto or thereby. According to an alternative embodiment, when it is determined that the probability information about the type class TYC is equal to or greater than the first sub-probability, the distance calculator DCP_b may generate the type signal TYS including the information indicating that the object OB is included in the reference object, and when it is determined that the probability information about the type class TYC is smaller than the first sub-probability, the distance calculator DCP_b may generate the type signal TYS including information indicating that the object OB is not included in the reference object.

The distance calculator DCP_b may compare the probability information about the distance classes DSC1 to DSC5 included in the second classification sensing signal CSS2 with the second sub-probability and may generate the distance information signal DIS_b.

The frame determiner FJP may determine whether the object OB approaches at every frame where the approach sensing block PCB is driven in response to the distance information signal DIS_b and may generate a preliminary approach information signal PPIS. In an embodiment, for example, the frame determiner FJP may receive the predetermined reference distance RFD and may generate the preliminary approach information signal PPIS based on the reference distance RFD and the distance information signal DIS_b. In an embodiment, for example, the preliminary approach information signal PPIS may be a signal obtained by determining whether the object OB approaches the display device DD for each frame. When it is determined that the adjacent distance included in the distance information signal DIS_b is equal to or smaller than the reference distance RFD, the frame determiner FJP may provide the preliminary approach information signal PPIS to the memory MM. When the adjacent distance included in the distance information signal DIS_b is greater than the reference distance RFD, the frame determiner FJP may not provide the preliminary approach information signal PPIS to the memory MM, however, the disclosure should not be limited thereto or thereby. According to an alternative embodiment, when it is determined that the adjacent distance included in the distance information signal DIS_b is equal to or smaller than the reference distance RFD, the frame determiner FJP may provide the preliminary approach information signal PPIS, which includes the information indicating that the object OB approaches, to the memory MM. When it is determined that the adjacent distance included in the distance information signal DIS_b is greater than the reference distance RFD, the frame determiner FJP may provide the preliminary approach information signal PPIS, which includes the information indicating that the object OB does not approach, to the memory MM.

The preliminary approach information signal PPIS from the frame determiner FJP may be accumulated in the memory MM. In an embodiment, for example, the memory MM may use n-bit storage space to store plural preliminary approach information signals PPIS. In an embodiment, for example, the memory MM may be a first-in first-out (FIFO) memory.

The approach determiner PJP_b may receive a predetermined reference value RN and may receive a cumulative value CV of the preliminary approach information signals PPIS from the memory MM. In an embodiment, for example, the reference value RN may indicate the number of driving frames, which is a minimum reference to generate the approach information signal PIS_b, and the number of the preliminary approach information signals PPIS accumulated during corresponding driving frames. In an embodiment, for example, in a case where the reference value RN is set to allow the number of driving frames, which is the minimum reference to generate the approach information signal PIS_b, to be ten and the number of preliminary approach information signals PPIS accumulated for the ten driving frames to be seven, the approach determiner PJP_b may generate the approach information signal PIS_b based on the number of the preliminary approach information signals PPIS measured for the ten driving frames. The cumulative value CV may indicate the number of the preliminary approach information signals PPIS accumulated in the memory MM for the driving frames corresponding to the reference value RN. Since the frame determiner FJP provides the preliminary approach information signal PPIS to the memory MM only when it is determined that the object OB approaches the display device DD, the approach determiner PJP_b may generate the approach information signal PIS_b including the information indicating that the object OB approaches when the preliminary approach information signals PPIS are accumulated seven times or more in the memory MM for the ten driving frames. According to an embodiment, when the preliminary approach information signals PPIS are accumulated six times or less in the memory MM for the ten driving frames, the approach determiner PJP_b may generate the approach information signal PIS_b including the information indicating that the object OB does not approach. However, the method in which the approach determiner PJP_b determines whether the object OB approaches the display device DD in response to the preliminary approach information signals PPIS stored in the memory should not be limited thereto or thereby. Since the approach determining part PDP_b includes the frame determiner FJP and the memory MM and the approach determiner PJP_b generates the approach information signal PIS_b based on the reference value RN, malfunctions that occur in each driving frame due to calculation errors may be prevented, and the operational reliability of the approach determiner PJP_a may be improved.

When the type signal TYS is provided from the distance calculator DCP_b, the approach determiner PJP_b may maintain the approach state of the object OB as the predetermined state. In an embodiment, for example, when the approach determiner PJP_b receives the type signal TYS, the approach determiner PJP_b may generate the approach information signal PIS_b based on the approach state of the object OB determined previously. In such an embodiment, when the approach determiner PJP_b receives the type signal TYS, the approach determiner PJP_b may generate the approach information signal PIS_b including information indicating that the object OB approaches the display device DD.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display panel;
an input sensing layer disposed on the display panel, wherein the input sensing layer outputs a sensing signal in response to an external input or an approach of an object; and
a sensing controller which controls a driving of the input sensing layer and receives the sensing signal from the input sensing layer,
wherein the sensing controller comprises:
a location sensing block which generates a location information signal including location information of the external input in response to the sensing signal; and
an approach sensing block which determines whether the object approaches in response to the sensing signal and generates an approach information signal,
wherein the approach sensing block comprises:
a signal classification part which generates a first classification sensing signal including information about a probability of the sensing signal to belong to each of a plurality of distance classes, wherein the distance classes are defined with respect to a distance between the object and the display device; and
an approach determining part which generates the approach information signal based on the first classification sensing signal.

2. The display device of claim 1, wherein the signal classification part generates the first classification sensing signal by using a convolutional neural network.

3. The display device of claim 2, wherein the signal classification part receives a prestored learning value provided thereto through the convolutional neural network and generates the first classification sensing signal by using the learning value.

4. The display device of claim 1, wherein the approach determining part comprises:
   a distance calculator which generates a distance information signal including an adjacent distance between the object and the display device in response to the first classification sensing signal; and
   an approach determiner which generates the approach information signal based on the distance information signal.

5. The display device of claim 4, wherein the approach determining part further comprises:
   a frame determiner which determines whether the object approaches at every frame based on the distance information signal and generates a preliminary approach information signal; and
   a memory which stores the preliminary approach information signal, wherein the preliminary approach information signal is provided in plural, and the approach determiner generates the approach information signal in response to the preliminary approach information signals stored in the memory.

6. The display device of claim 5, wherein the frame determiner receives a reference distance to determine whether the object approaches, compares the adjacent distance included in the distance information signal with the reference distance, and accumulates the preliminary approach information signal in the memory when the adjacent distance is equal to or less than the reference distance.

7. The display device of claim 6, wherein the approach determiner compares a cumulative value of the preliminary approach information signal accumulated in the memory with a predetermined reference value and generates the approach information signal.

8. The display device of claim 6, wherein
   the signal classification part generates a second classification sensing signal including information about a probability of the sensing signal to belong to each of the distance classes and a type class based on the distance classes and the type class, wherein the type class is defined with respect to a type of a predetermined reference object, and
   the distance calculator generates a type signal including information indicating that the object is included in the reference object when it is determined that the object is included in the reference object in response to the second classification sensing signal.

9. The display device of claim 8, wherein the approach determiner generates a state signal to maintain the approach state of the object as a predetermined state in response to the type signal.

10. The display device of claim 1, wherein the input sensing layer comprises:
    a plurality of scan electrodes; and
    a plurality of sensing electrodes electrically insulated from the scan electrodes,
    wherein the sensing controller transmits an input scan signal to the scan electrodes and receives the sensing signal from the sensing electrodes.

11. The display device of claim 10, wherein the input sensing layer generates the sensing signal by using a mutual capacitance method.

12. The display device of claim 10, wherein the sensing controller further comprises a driving block which applies the input scan signal to the input sensing layer at a first driving frequency or a second driving frequency different from the first driving frequency.

13. The display device of claim 12, wherein the driving block applies the input scan signal to the input sensing layer at one of the first driving frequency and the second driving frequency, which is determined based on the approach information signal.

14. The display device of claim 13, wherein
    the driving block applies the input scan signal to the input sensing layer at the first driving frequency when the approach information signal includes first state information indicating that the object approaches, and applies the input scan signal to the input sensing layer at the second driving frequency when the approach information signal includes second state information indicating that the object does not approach, and
    the first driving frequency is higher than the second driving frequency.

15. The display device of claim 14, wherein the location sensing block generates the location information signal at a same frequency as the one of the first driving frequency and the second driving frequency at which the driving block applies the input scan signal to the input sensing layer.

16. The display device of claim 12, wherein the approach sensing block generates the approach information signal at an approach sensing frequency different from the first and second driving frequencies.

17. The display device of claim 16, wherein the approach sensing frequency is lower than each of the first and second driving frequencies.

18. The display device of claim 1, wherein the sensing controller further comprises a signal compensation block which removes a noise component included in the sensing signal and generates a compensation sensing signal,
    the location sensing block generates the location information signal in response to the compensation sensing signal, and
    the approach sensing block generates the approach information signal in response to the compensation sensing signal.

19. The display device of claim 1, wherein the display panel comprises:
    a base layer;
    a display element layer disposed on the base layer and which comprises a plurality of pixels; and
    an encapsulation layer disposed on the display element layer,
    wherein the input sensing layer is disposed directly on the encapsulation layer.

* * * * *